United States Patent
Baptista et al.

(10) Patent No.: US 9,048,922 B2
(45) Date of Patent: Jun. 2, 2015

(54) METHOD AND SYSTEM FOR ALLOCATING BANDWIDTH

(75) Inventors: Carlos Elisio Baptista, Rio de Janeiro (BR); Wilson Cardoso, Sao Paulo (BR)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 932 days.

(21) Appl. No.: 12/449,110

(22) PCT Filed: Jan. 18, 2008

(86) PCT No.: PCT/EP2008/000380
§ 371 (c)(1), (2), (4) Date: Jul. 23, 2009

(87) PCT Pub. No.: WO2008/089921
PCT Pub. Date: Jul. 31, 2008

(65) Prior Publication Data
US 2010/0067432 A1    Mar. 18, 2010

(30) Foreign Application Priority Data

Jan. 24, 2007 (EP) .................................. 07001455

(51) Int. Cl.
*H04W 4/00* (2009.01)
*H04B 7/185* (2006.01)
(52) U.S. Cl.
CPC .................................. *H04B 7/18582* (2013.01)
(58) Field of Classification Search
CPC .................................................... H04W 72/04
USPC ................. 370/230, 235, 316–327, 347–350, 370/352–356, 468–474, 486–497
See application file for complete search history.

(56) References Cited

U.S. PATENT DOCUMENTS

| 6,804,201 | B1 | 10/2004 | Gelenbe |
| 6,912,209 | B1 * | 6/2005 | Thi et al. ........................ 370/286 |
| 7,706,385 | B2 * | 4/2010 | Yeom ....................... 370/395.41 |
| 2005/0054363 | A1 * | 3/2005 | Marinov et al. ............... 455/522 |

(Continued)

FOREIGN PATENT DOCUMENTS

| EP | 1 244 229 A2 | 9/2002 |
| EP | 1 283 625 A1 | 2/2003 |
| EP | 1 605 608 A1 | 12/2005 |

OTHER PUBLICATIONS

E. Gelenbe et al.; "Traffic Balancing via Smart Packets"; 3rd IEEE Workshop on IP Operations & Management; Oct. 2003; pp. 15-21.

(Continued)

*Primary Examiner* — Iqbal Zaidi
(74) *Attorney, Agent, or Firm* — Staas & Halsey LLP

(57) ABSTRACT

For VoIP calls over a communication system in which a remote terminal is requesting to a hub-gateway, bandwidth may be allocated according to a dynamic technique based on the packet rate between an access device and the remote terminal by sending a bandwidth request message from the access device to the hub-gateway or to the remote terminal containing information on bandwidth allocation requirements for a given set of VoIP calls. The hub-gateway or the remote terminal identifies the received messaged information and analyzes the information on bandwidth allocation requirements contained in the messaged information. In addition, the hub-gateway, or the remote terminal, upon necessity, sends a request to the hub-gateway for bandwidth to be allocated in accordance with the analyzed information on bandwidth allocation requirements.

20 Claims, 9 Drawing Sheets

(56) References Cited

U.S. PATENT DOCUMENTS

2007/0280125 A1* 12/2007 Sonnier .................. 370/252
2008/0298299 A1* 12/2008 Thesling ................. 370/316

OTHER PUBLICATIONS

V. Kueh et al.; Enhancing the Radio Link Protocol for VoIP Session Establishment Signalling over Satellite-UMTS; IEEE 59th Vehicular Tech. Conf.; May 2004; pp. 2787-2791.

Y. Rekhter et al.; "Address Allocation for Private Internets"; Network Working Group; RFC 1918; Feb. 1996, pp. 1-9.
E. Kohler et al.; Datagram Congestion Control Protocol (DCCP); Network Working Group; RFC 4340; Mar. 2006; pp. 1-130.
"Digital Video Broadcasting (DVB); Interaction Channel for Satellite Distribution Systems"; ETSI EN 301 790 V1.4.1; Sep. 2005; pp. 1-117.
International Search Report for Application No. PCT/EP2008/000380; mailed Mar. 14, 2008.

* cited by examiner

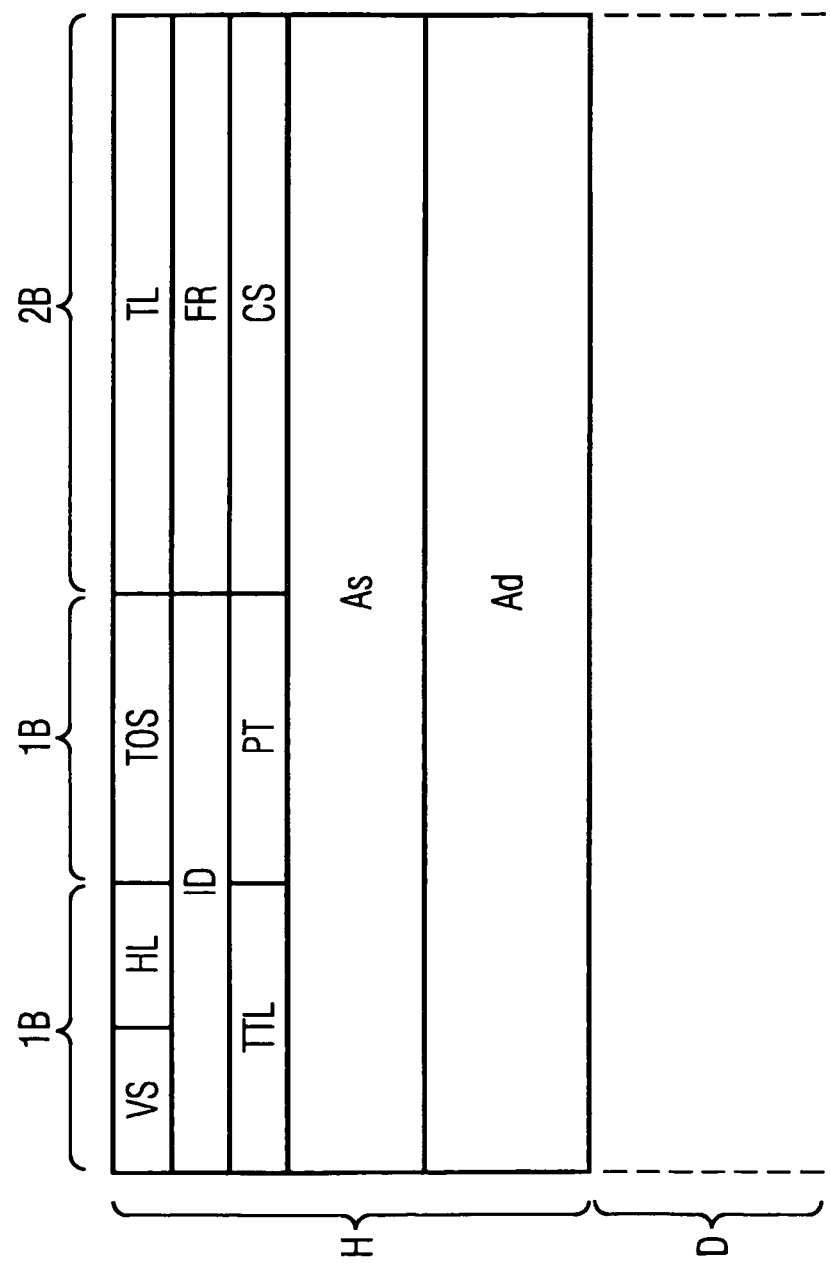

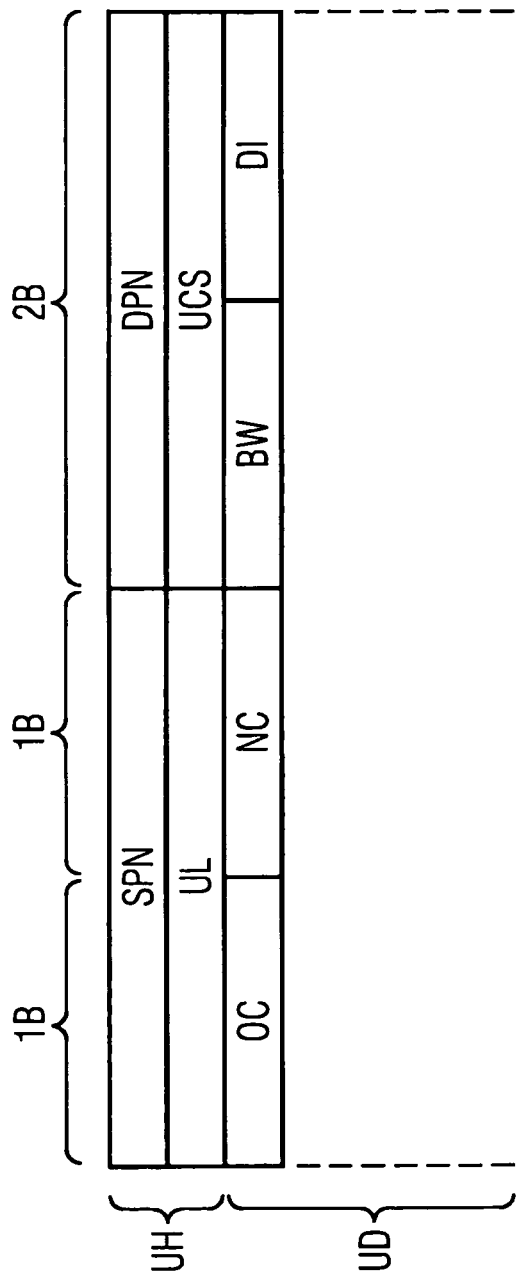

METHOD AND SYSTEM FOR ALLOCATING BANDWIDTH

CROSS REFERENCE TO RELATED APPLICATIONS

This application is a U.S. national stage of International Application No. PCT/EP2008/000380, filed Jan. 18, 2008 and claims the benefit thereof. The International Application claims the benefits of European Application No. 07001455.0 filed on Jan. 24, 2007, both applications are incorporated by reference herein in their entirety.

BACKGROUND

Described below is a method of bandwidth allocation in VoIP telecommunication systems in which bandwidth is allocated according to dynamic rate based techniques.

The method is explained in its possible uses in satellite telecommunication systems.

In satellite communications, bandwidth is scarce and therefore expensive. Scarcity of satellite bandwidth requires the reutilization of bandwidth by suitable centralized methods of access controlled by a hub-gateway device. Such centralized methods of bandwidth rate control has the major drawback of implying round trip satellite link delays for bandwidth allocation to remote stations to be accomplished by the hub-gateway, as it is schematically illustrated by FIGS. 1 to 5.

FIG. 1 is a block diagram schematically illustrating an example architecture of a satellite communication system, partially packet-based, as known from the related art.

A communications satellite SAT is in communication with a plurality of remote satellite stations VSAT, also called Very Small Aperture Terminals (VSATs), and with a hub-gateway HG.

An example of IP broadband satellite system is Digital Video Broadcasting-Return Channel Satellite system (DVB-RCS), as defined by ETSI-standard EN 301790 [1]. The remote satellite stations VSAT, in DVB-RCS terminology, are called Return Channel Satellite Terminals(RCSTs).

Other examples of IP broadband satellite systems include ViaSat Docsis and Hughes IP-OS.

The hub-gateway HB is a device responsible of controlling bandwidth assignment upon requests arriving from the remote satellite stations VSAT. The hub-gateway HB is, on one side, in communication with the remote satellite stations VSAT, via the geostationary communications satellite SAT, on the other side with one of more networks, e.g. ATM, IP, PSTN, GSM.

Each remote satellite station VSAT is in communication, via an Ethernet interface EI, with an access device AD1, AD2, AD3, directly, as for examples in case of VoIP gateway AD1, or, indirectly, as in case of a presence of a Ethernet switch ES between the access devices CPG, SIP-phone, BTS AD2, AD3, AD4 and the remote satellite terminal VSAT.

Examples of access devices AD1, ..., AD6 include H.248/SIP/MEGACO access gateways, CPGs, mini trunking gateways, base stations, NANO BTSs, SIP phones.

Device A.BIS denotes the interface between the base transceiver station AD5 and the base station controller, not shown.

There are several known schemes for requesting bandwidth capacity by remote satellite devices VSAT.

A first known scheme for requesting bandwidth capacity is a scheme in which dedicated bandwidth is allocated between the remote satellite station VSAT and the hub-gateway HG based on some signaling from the access devices AD1, ..., AD5 or as a result of a configuration action taken by the hub-gateway HG itself. With dedicated bandwidth allocation schemes, the operator typically allocates to a remote satellite terminal VSAT a fixed bandwidth, e.g. 20 kbps, which is always there even if no data is being transmitted over the Ethernet interface EI.

A second known scheme is for requesting bandwidth capacity is a scheme on which bandwidth is allocated dynamically based on the packet rate. The allocated bandwidth depends on the packet rate arriving at the remote station VSAT from its connected access device AD1, ..., AD5.

In DVB-RCS systems, examples of the above mentioned two known schemes for bandwidth allocation are Rate-Based Dynamic Capacity (RBDC) and Continuous Rate Assignment (CRA) corresponding to rate-based bandwidth allocation and to dedicated bandwidth allocation, respectively.

RBDC allocation has the advantage that it avoids the bandwidth waste of CRA dedicated allocation for allowing bandwidth reutilization. In RBDC allocation, the remote terminal VSAT keeps asking the hub-gateway HG for bandwidth as VoIP packets flow from the VoIP access gateway AD1, ..., AD5 to the remote terminal VSAT and it ceases to do so as soon as packets stop being sent.

FIG. 2 is block diagram schematically illustrating an example of a rate-based dynamic bandwidth allocation during the set-up phase of a VoIP call as known from the related art.

Before the VoIP call connection is set up, the access gateway device AD is in a sleep mode, i.e. there is no activity in the communication with the remote satellite terminal VSAT, since no traffic is present. At a certain moment in time, when a subscriber goes off-hook, the access device AD itself issues a dial-tone, the subscriber starts to dial, the access device AD bitmaps the incoming dialing digits and when the subscriber ends dialing, signaling packets are sent to the remote satellite terminal VSAT.

In step ST21, packets P1, ..., P4 start to flow from the access device AD to the remote satellite terminal VSAT.

The remote satellite terminal VSAT has to send these packets P1, ..., P4 to the hub-gateway HG over the satellite link, which is the communications path between the remote satellite station VSAT and the hub-gateway HG via the communications satellite SAT. However, since before, no traffic was going through, due to the rate-based dynamic bandwidth allocation, no bandwidth was previously allocated for this task. Thus, in step ST22, the remote satellite terminal VSAT requests bandwidth allocation to the hub-gateway HG on a RBDC basis.

Thus, with RBDC allocation, the packets P1, ..., P4 sent over the Ethernet interface EI from the access device AD to the remote terminal VSAT make the remote satellite terminal VSAT react and ask, in step ST22, to the hub-gateway HG for bandwidth equivalent to the rate being transmitted.

However, the bandwidth request of step ST22 to the hub-gateway HG implies a satellite round-trip delay between the remote satellite terminal VSAT and the hub-gateway HG.

In fact, the bandwidth request of step ST22 arrives to the hub-gateway HG via the satellite link and, in turn, in step ST23, the hub-gateway HG has to communicate to the remote satellite terminal VSAT when the bandwidth is actually allocated. Only then, the remote satellite terminal VSAT is able to transmit, in step ST24, according to the allocated bandwidth.

The round trip delay is often perceived by subscribers. In fact, the round trip delay may be of the order of ca 500 ms if propagation time alone is taken into account but other factors may contribute to longer delays. Thus, with RBDC allocation a first drawback is that, at the start-up phase of a VoIP phase, the packets P1, ..., P4 arriving at the remote satellite station VSAT sit on an input buffer, not shown, in the remote satellite terminal VSAT, waiting for system reaction and for bandwidth allocation, thus causing a jitter at the beginning of the VoIP communication.

In FIGS. 2 to 7, the connections among the remote satellite terminals VSAT, the communications satellite SAT and the hub-gateway HG, denoted with a thick black line are connections in which data is transmitted, as for example in steps ST24, ST34, ST64, while the connection denoted with a dashed line are connections in which internal control information between the hub-gateway HG and the remote satellite VSAT is transmitted as for example in steps ST22, ST23, ST32, ST33.

FIG. 3 is a block diagram schematically illustrating an example of a rate-based dynamic bandwidth allocation with silence-suppression as known from the related art.

FIGS. 4 and 5 are the continuation of FIGS. 3 and 4, respectively.

In FIG. 3, at the set up of the VoIP call, in step ST31, the packets P1, P2 produce a bandwidth request. Operations performed for packets P1, P2 in steps ST32, ST33, ST34 are the same as the operations performed in steps ST22, ST23, ST24 of FIG. 2 for packets P1, . . . , P4.

Step ST31a represents a period of silence in voice communication which is occurring between packets P1, P2 and packets P3, P4.

With RBDC allocation in which voice activity detection/silence suppression is activated, when the subscriber of the established VoIP call goes silent, since there are no packet transmitted over the Ethernet interface EI for a while between the access device AD to the remote satellite terminal VSAT, the rate ceases to be there and therefore the remote terminal VSAT does not keep asking the hub-gateway HG over the satellite link for bandwidth, and the hub-gateway HG smoothly knocks down the previously allocated RBDC bandwidth for the VoIP call.

As shown in FIG. 4, in step ST41a, there is a period of silence in which packets are not sent until, in step ST41, new voice packets P3, P4 are sent. Due to the silence period of step ST41a, bandwidth is de-allocated in step ST42. As a consequence, when the subscriber starts talking again, the new voice packets P3, P4 have to sit for a while on the input buffer, not shown, of the remote satellite terminal VSAT until the satellite system reacts and allocates RBDC-based bandwidth again, as shown in FIG. 5.

Unfortunately the fact that the voice packets P3, P4 have to sit in the input buffer creates jitter during VoIP communication.

Hence, as above explained, the major drawback of known rate-based dynamic bandwidth allocation methods is that, in VoIP communication over satellite system, jitter is caused at the beginning of a VoIP call connection and, during a VoIP call connection, in case silence suppression is activated.

SUMMARY

An aspect is to overcome the above mentioned drawbacks, in particular by providing a method and a system for dynamically allocating bandwidth in which jitter is minimized.

The aforementioned aim is achieved by a method and a system for allocating bandwidth for VoIP calls over a satellite communication system, in which a remote satellite terminal is requesting to a hub-gateway, bandwidth to be allocated according to a dynamic technique based on the packet rate between an access device and the remote satellite terminal. The method includes:

a) by the access device, sending a bandwidth request message to the remote satellite terminal or to the hub-gateway containing information on bandwidth allocation requirements for a given set of VoIP calls;

b) by the remote satellite terminal or by the hub-gateway, identifying the received messaged information;

c) by the remote satellite terminal or by the hub-gateway, analyzing the information on bandwidth allocation requirements contained in the messaged information; and d) by the remote satellite terminal or by the hub-gateway, upon necessity, requesting to the hub-gateway bandwidth to be allocated in accordance with the analyzed information on bandwidth allocation requirements.

The aforementioned aim is achieved by a method and a system for allocating bandwidth for VoIP calls over a communication system, in which a remote terminal is requesting to a hub-gateway, bandwidth to be allocated according to a dynamic technique based on the packet rate between an access device and the remote terminal. The method includes:

a) by the access device, sending a bandwidth request message to the remote terminal or to the hub-gateway containing information on bandwidth allocation requirements for a given set of VoIP calls;

b) by the remote terminal or by the hub-gateway, identifying the received messaged information;

c) by the remote terminal or by the hub-gateway, analyzing the information on bandwidth allocation requirements contained in the messaged information; and d) by the remote terminal or by the hub-gateway, upon necessity, requesting to the hub-gateway bandwidth to be allocated in accordance with the analyzed information on bandwidth allocation requirements.

In embodiments, the bandwidth request message may be a smart IP packet (SP) having the function of a bandwidth control message packet.

In embodiments, the bandwidth request message may be exchanged via a TCP connection, or via a UDP packet exchange, or via Ethernet packets or via other means.

In item (d) of embodiments, the requested bandwidth to be allocated may advantageously be bandwidth to be added, such as during the set-up phase of the set of VoIP calls.

In item (d) of embodiments, the requested bandwidth to be allocated may conveniently be a minimum amount of bandwidth to be kept during the duration of the set of VoIP calls, particularly when the set of VoIP calls are treated with silence suppression techniques.

In embodiments, the IP header of the smart IP packet may be marked to identify the bandwidth control message.

In embodiments, the data part of the smart IP packet may conveniently be set to provide information on bandwidth allocation requirements for a given set of VoIP calls.

In embodiments, the smart IP packet may conveniently be an UDP packet.

In embodiments, the information on bandwidth allocation requirements contain one or more of the following:
  allocation mode to be performed, "add" or "keep";
  number of established calls;
  minimum bandwidth to be allocated per service/call;
  device identifier.

With embodiments described herein, during VoIP communication, the remote satellite terminal is enabled to allocate rate based dynamic bandwidth, even when there is no rate between the access device and the remote satellite device.

The embodiments allow better communication quality by minimizing jitter and thus reducing round trip delay perception by subscribers. In fact, the bandwidth is either primed or kept for transmitting signaling or voice packets in the presence of silence suppression over the satellite link, with the subscriber perceiving minimal delay, additional to propagation delay, between the dialing phase and the connection phase with the other party or experiencing minimal voice jitter during VoIP voice flow after through-connect state is reached.

The proposed embodiments allow better bandwidth reutilization as it does not require tying up the whole bandwidth necessary for a call. In fact, less average bandwidth is tied up during a VoIP call than the average bandwidth required in a VoIP call without silence suppression.

In fact, tying up even a small amount of bandwidth for each end terminal, as e.g. 1 Kbit/s, in dedicated bandwidth allocation mechanisms to each terminal would result in less bandwidth reutilization among the remote satellite terminals VSAT. For example, a growth of the number of end-terminals connected to VoIP access gateways towards the thousands implies that the overall tied up bandwidth is in the MHz range being thus wasteful and expensive.

In order to save power, IP broadband satellite terminals may go into a sleep mode when idle. This is a typical case in solar-powered terminals. Generally, when activity is detected at the Ethernet interface, the outdoor unit power transmitter of the remote satellite terminal is switched on again and brought out of the energy-saving idle state, such activity requiring a few seconds. With the proposed embodiments it is possible to produce an earlier wake-up due to sending smart IP packet ahead of protocol signaling.

The embodiments can be standardized for use with several IP broadband satellite solutions.

With the proposed embodiments, there is no impact on the satellite aerial interface. The proposed embodiments are signaling-protocol independent, since they produce no change on the NGN signaling protocols being used, e.g. SIP, MEGACO, MGCP, H.323. In fact, any protocol such as IP, MEGACO or to any other signaling protocol such as MGCP or SIP, can be used. Solely, the access devices have to be able to handle, generate and send at the right time bandwidth control messages and the remote satellite terminals have to be able to receive, interpret and take appropriate actions in accordance with the control bandwidth messages. As regards the hub-gateway side, the proposed embodiments have no impact.

The proposed embodiments expedites the signaling over the satellite link between the VoIP gateway and a softswitch and reduces time-out occurrences, thereby improving performance of NGN overlaid to IP broadband satellite systems.

BRIEF DESCRIPTION OF THE DRAWINGS

These and other aspects and advantages will become more apparent and more readily appreciated from the following description of the exemplary embodiments, taken in conjunction with the accompanying drawings of which:

FIG. 8 schematically illustrates an IP packet;
FIG. 9 schematically illustrates an UDP packet.

DETAILED DESCRIPTION OF THE PREFERRED EMBODIMENT

Figure 1:
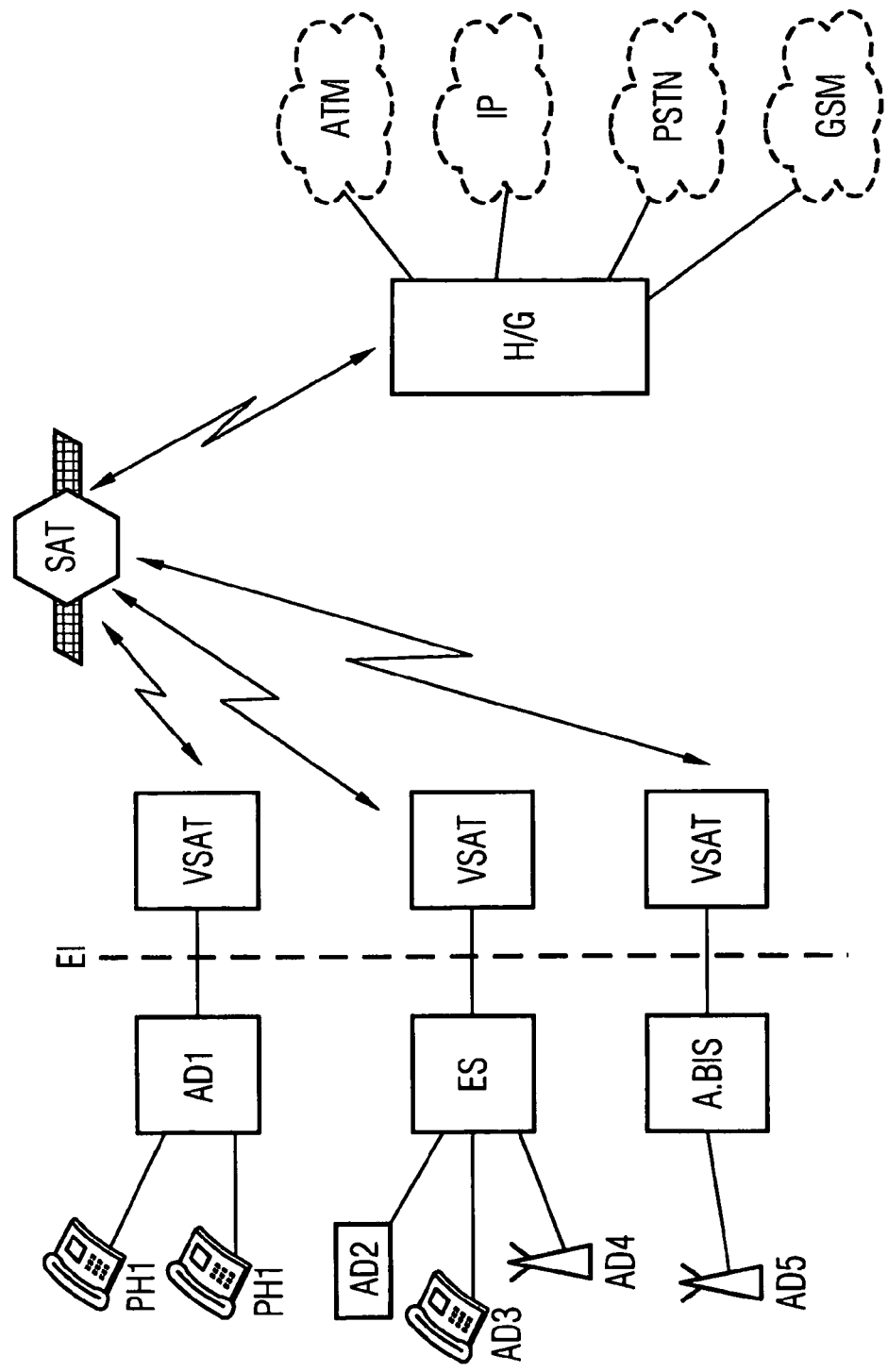
FIG. 1 is a block diagram schematically illustrating an example architecture of a satellite communication system in the related art.
Figure 2:
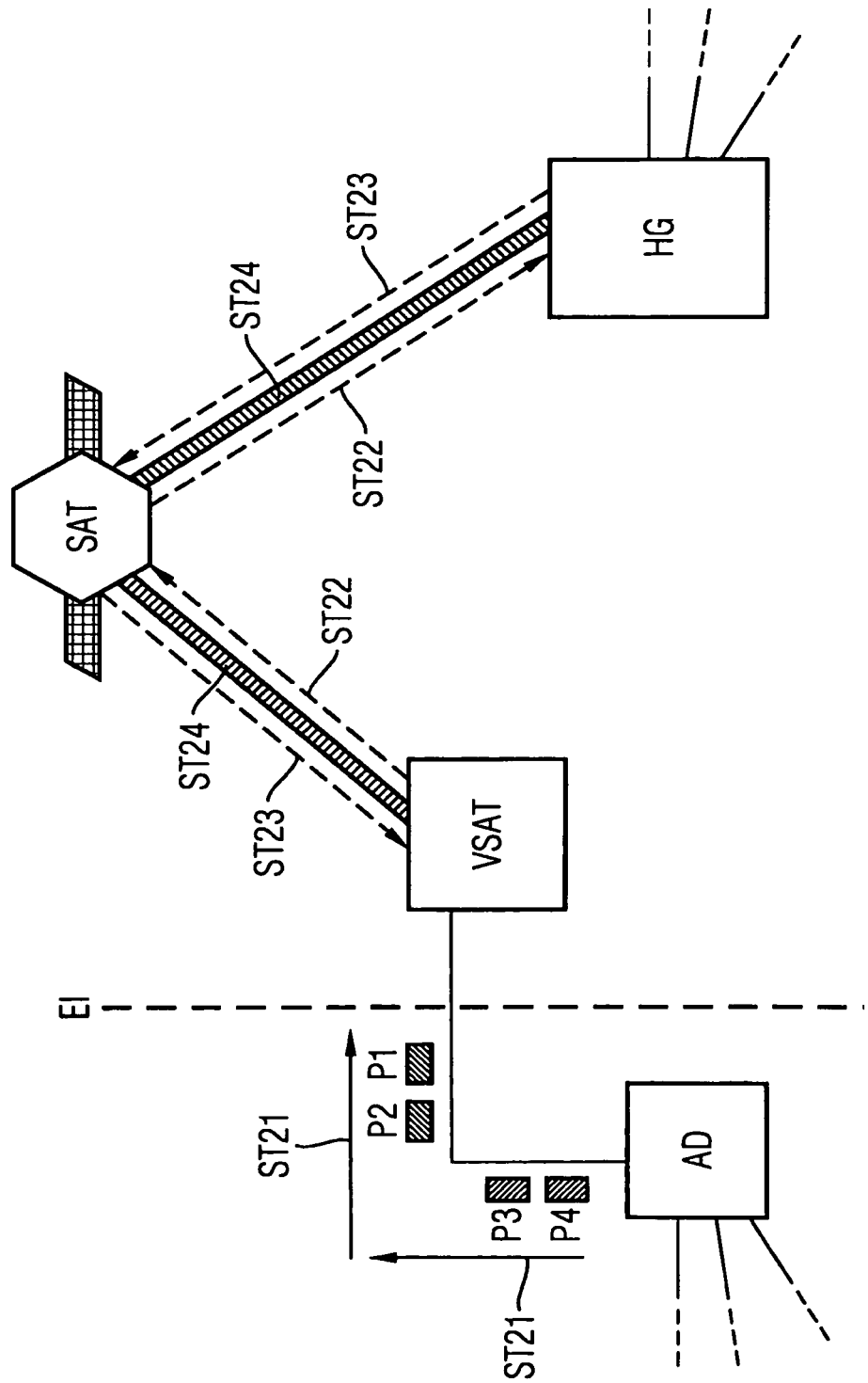
FIG. 2 is a block diagram schematically illustrating an example of a rate-based dynamic bandwidth allocation in the related art.
Figure 3:
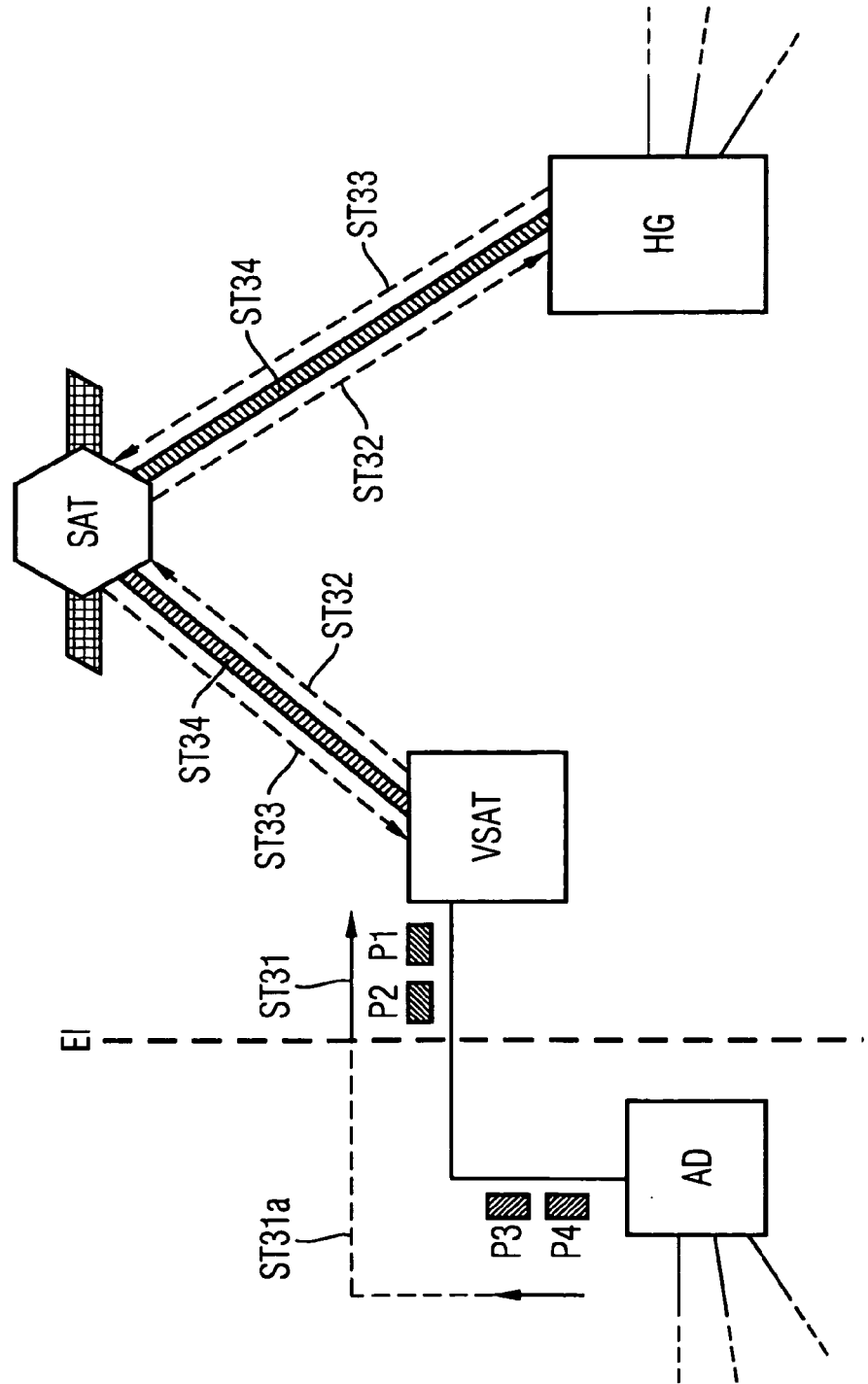
FIG. 3 is a block diagram schematically illustrating an example of a rate-based dynamic bandwidth allocation with silence suppression in the related art.
Figure 4:
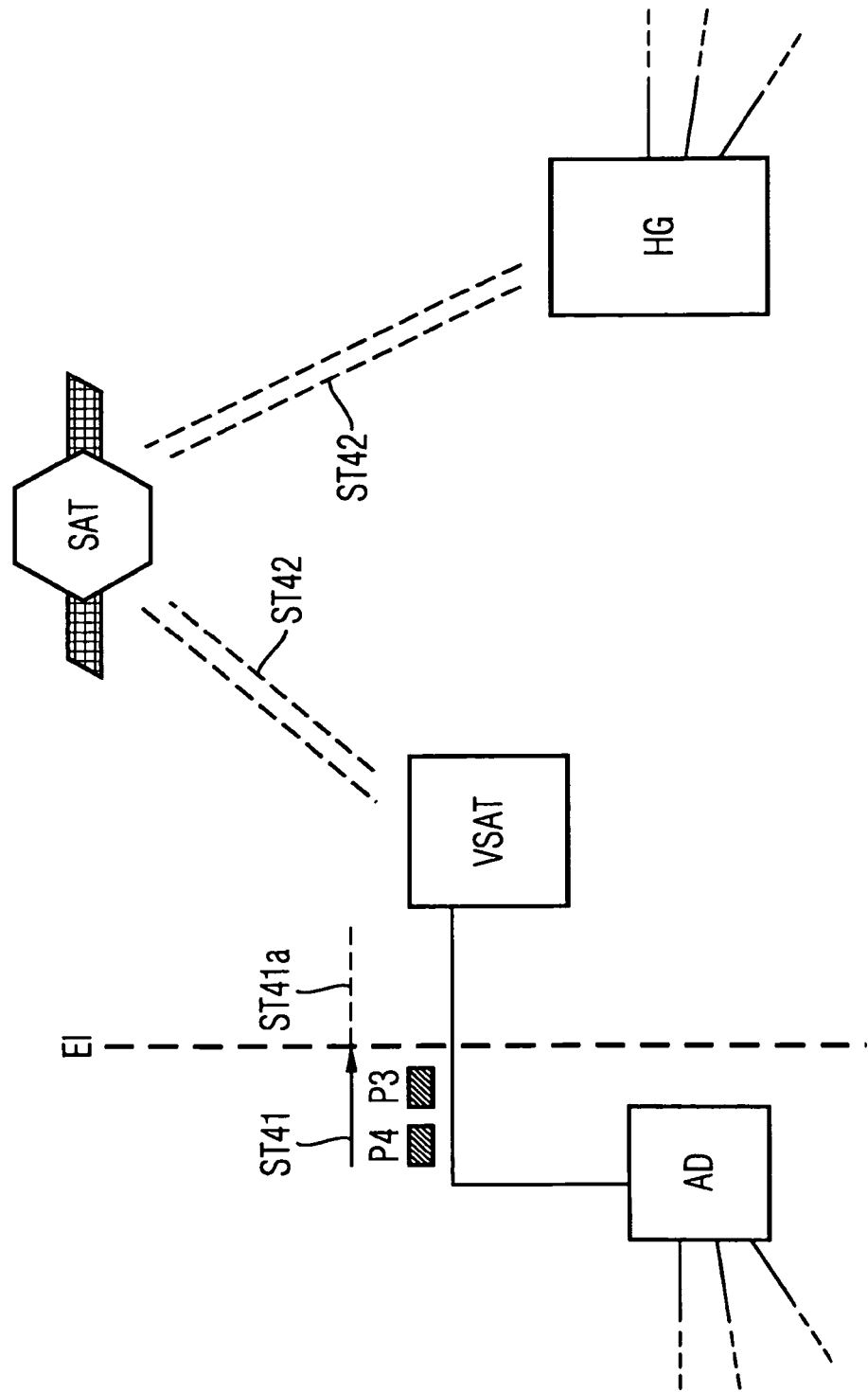
FIG. 4 is the continuation of FIG. 3 in the related art.
Figure 5:
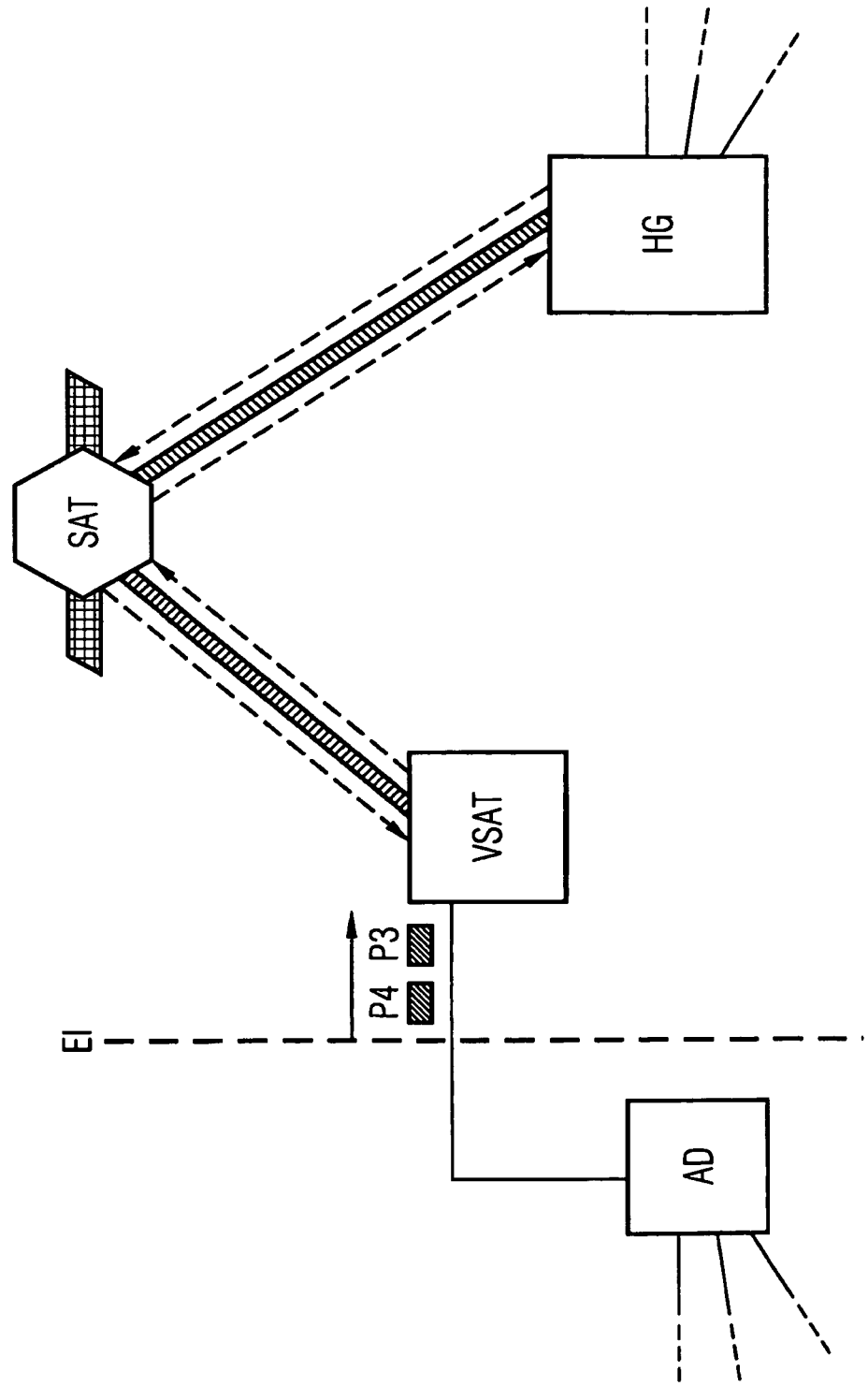
FIG. 5 is the continuation of FIG. 4 in the related art.

Reference will now be made in detail to the preferred embodiments, examples of which are illustrated in the accompanying drawings, wherein like reference numerals refer to like elements throughout.

FIGS. 1 to 5 were already discussed in previous sections.

According to the embodiments, in a satellite system in which VoIP communication is using dynamic rate-based allocation techniques, the access device is able to communicate with the remote satellite terminal by bandwidth control messages. Such bandwidth control messages contain information, to be used by the remote satellite terminal, on the requirements for bandwidth allocation for one or more VoIP calls. The remote satellite terminal is able to identify the received message packets as control message packets, distinguishing them from data/voice packets that have to be transmitted over to the satellite link. Once it received the bandwidth request, the remote satellite terminal analyzes the information contained in the messages on bandwidth allocation requirements for the given set of VoIP calls. If the analyzed information is such that bandwidth allocation is required, the remote satellite terminal requests to the hub-gateway bandwidth to be allocated in accordance with the control message requirements.

In a first scenario, the requirements on bandwidth allocation contained in the control message are sent to the remote satellite terminal at the set-up phase of VoIP calls. At the initial phase of the VoIP communication, during the call set-up phase, in the signaling phase, the control message sent from the access device instructs the remote satellite terminal to add/prime a defined amount of bandwidth.

The bandwidth amount to be added may be added, all at once, in a single step, to include directly the bandwidth requirements for VoIP packets during VoIP communication.

Alternatively, in further embodiments, the bandwidth amount to be added may be added, stepwise, to include, in a first step, the bandwidth requirements for signaling packets only, e.g. SIP or MEGACO packets, and, only later at the end of the set-up phase, in a second step, the bandwidth requirements for VoIP packet communication.

Advantageously, since the access gateway sends, at a predefined early time, to the remote satellite terminal the control bandwidth message containing information to add bandwidth, e.g. 20 kbit/s for a VoIP call, then, when the signaling packet goes from access gateway to the remote satellite terminal and later when VoIP packets start to flow, there is no initial jitter.

The above mentioned predefined early time in which the access device sends the bandwidth control message may be any moment between the moment in which the subscriber starts dialling until the moment the subscribers finishes dialling. For example, if the access device has the intelligence to understand that the subscribers has finished dialing, e.g. as it is the case for a VoIP gateway able of accumulating the dialled digits, then the predefined early time may be some time before the end of the dialing, taking round trip delay time into account. Otherwise, if the access device does not have such capability, the access device may be enabled to send the control bandwidth message after a predefined number of dialled digits. The predefined number of dialled digits may depend on the initial digits of the country and/or area code.

Figure 6:
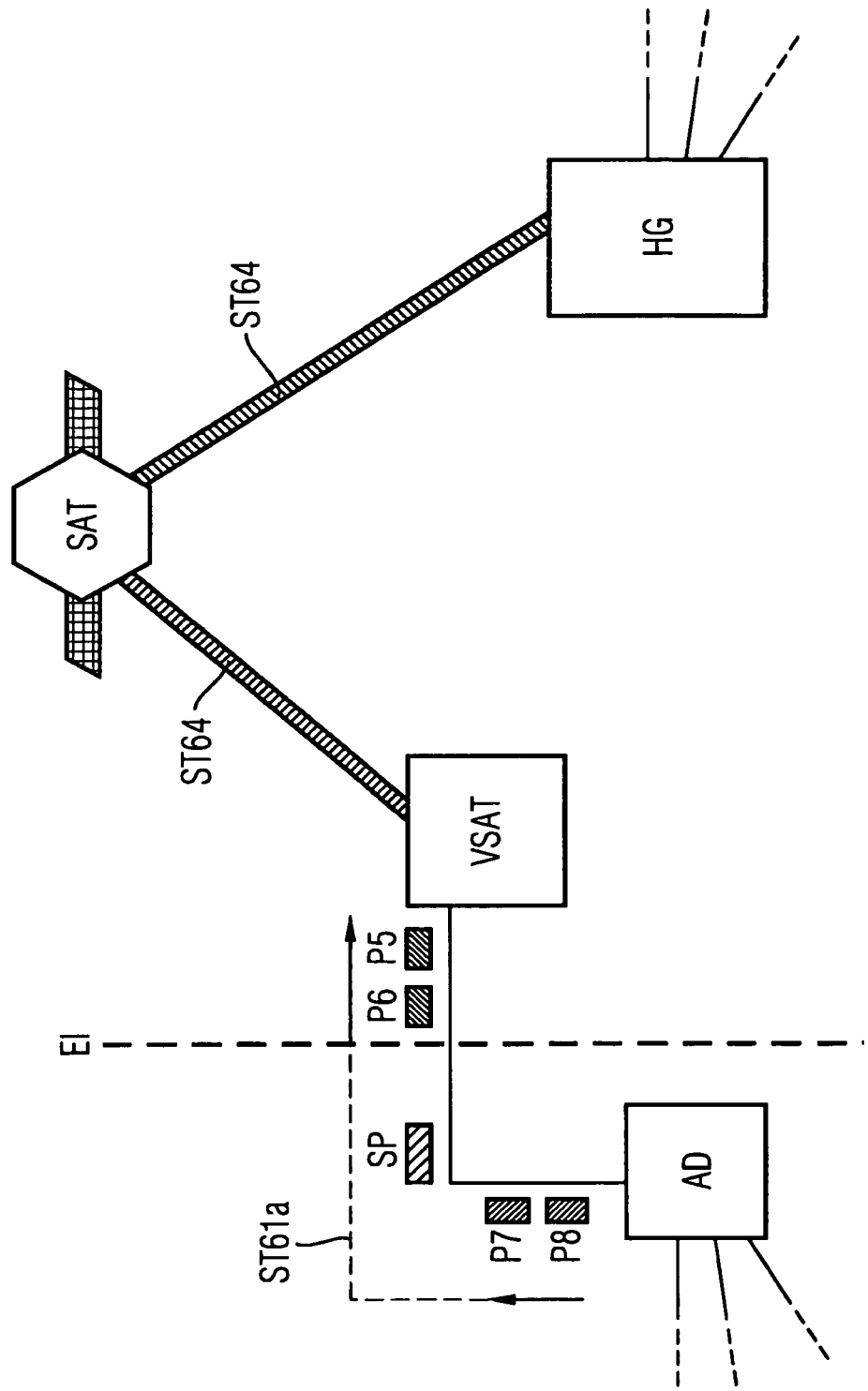
FIG. 6 block diagram schematically illustrating an example embodiment.

FIG. 6 is a block diagram schematically illustrating an example embodiment.

Figure 7:
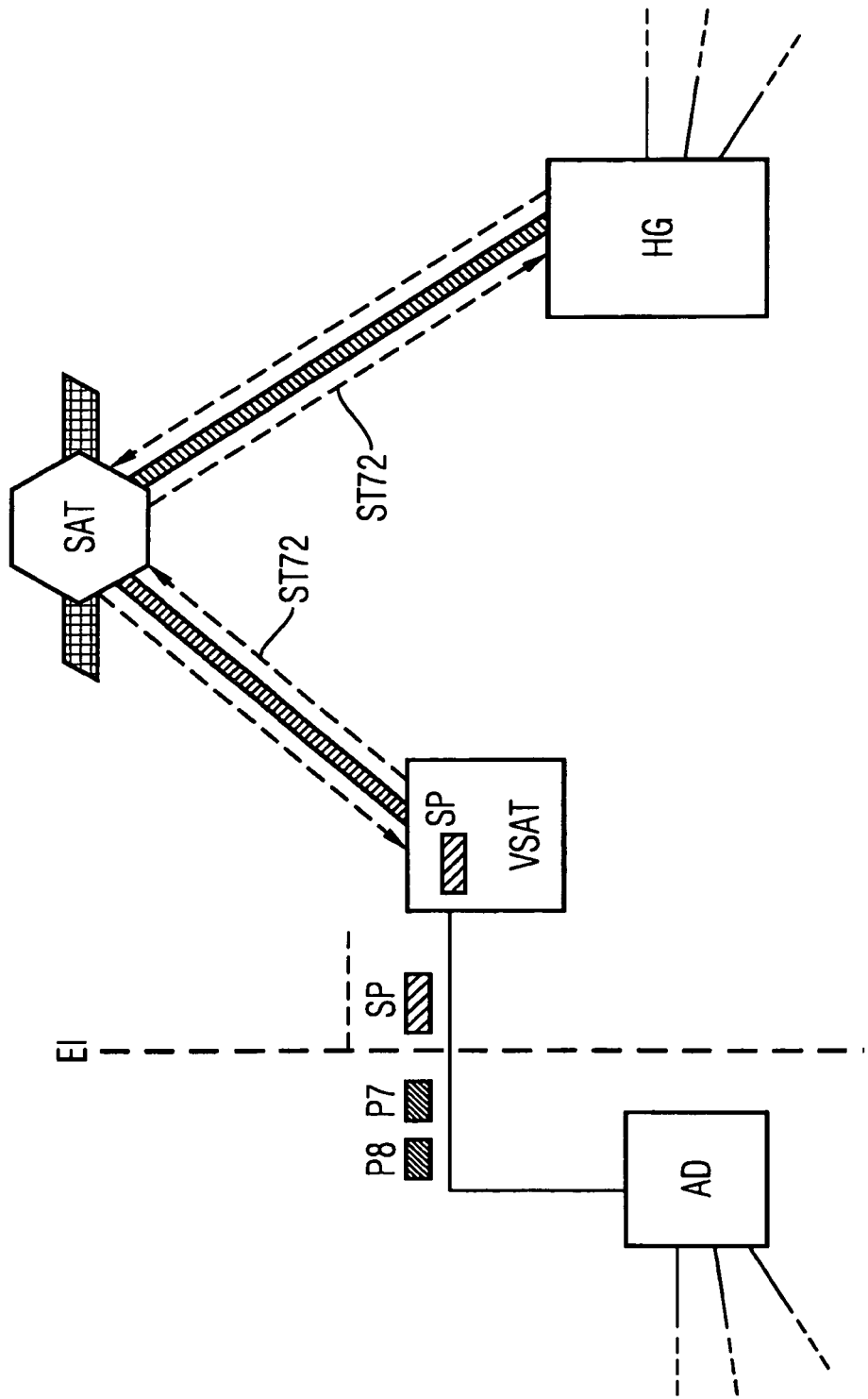
FIG. 7 is the continuation of FIG. 6.

FIG. 7 is the continuation of FIG. 6.

FIGS. 6 and 7 schematically illustrate a second scenario, in which the requirements on bandwidth allocation contained in the control message are sent to the remote satellite terminal VSAT during the duration of the VoIP call. More in particular, the control message is sent in conjunction with silence suppression.

In an established VoIP call, as shown in FIG. 6, VoIP packets P5, P6 are able to be transmitted over the satellite link, according to the dynamic rate-based allocated bandwidth via step ST64.

Step ST61a represents a period of silence in voice communication which is occurring between packets P5, P6 and packets P7, P8, due to silence suppression techniques coming into effect during the period of silence of the subscriber. After the period of silence, in which packets are not sent, new voice packets P7, P8 are sent.

In order to prevent the bandwidth to be de-allocated due to the mechanism of rate-based dynamic bandwidth allocation, during the silent period, the access device AD sends some control bandwidth messages to instruct the remote satellite terminal VSAT to keep/maintain a minimum amount of bandwidth, e.g 15 kbit/s, for the existing call so that when the subscriber starts talking again the packets P7, P8 can be transmitted right away while some additional bandwidth, e.g. 5 kbit/s, is automatically requested. Whereas it is assumed here that 20 kbit/s is the bandwidth to be allocated for a VoIP call during the phase of VoIP communication.

In embodiments, the bandwidth control message is a smart IP packet SP.

In FIG. 7, in step ST72, it is shown that smart packets SP cause a minimum bandwidth to be kept allocated during silence so that when packets P7, P8 arrive they can be transmitted over.

The access device AD sends the control messages to the remote satellite terminal VSAT with a certain periodicity, possibly depending on the required time for knocking down of bandwidth.

Advantageously, during established VoIP calls, the bandwidth control message is able to instruct the remote satellite terminal VSAT to keep/maintain a certain minimum amount of bandwidth so that when the subscriber starts talking again, after a silence period, jitter is minimized.

As illustrated in the two scenarios, the bandwidth control message may be, in the first scenario, a bandwidth primer and, in the second scenario, a bandwidth maintainer for VoIP dynamic rate-based allocated bandwidth services over satellite.

Thus, control bandwidth packet contain, among other, information about how much bandwidth should be added to the dynamic rate-based bandwidth already allocated to the remote satellite VSAT or how much minimum bandwidth should be maintained in order to avoid jitter problems when silent connected subscribers start talking again.

In any of the two scenarios, the remote satellite terminal VSAT has to have the intelligence/capability of handling the bandwidth request messaging.

For example, the remote satellite terminal may be able of distinguishing/identifying the smart IP packets SP from VoIP packets and other signaling packets, e.g., SIP, MEGACO and others, which are all interpreted as data to be transmitted by the remote satellite terminal VSAT.

The remote satellite terminal VSAT may be capable of analyzing IP information contained, e.g. in IP header H, contained in IP data part D or contained in any next-layer protocol enveloped inside the IP packet. Upon analyzing IP packet information, the remote satellite terminal VSAT is capable of taking appropriate action based on the contents of the messaged information.

In embodiments, once the smart IP packets SP are recognized by the remote satellite terminal VSAT, they may not be transmitted over and may be discarded by the remote satellite terminal VSAT.

The messaging of bandwidth requests is done from the access device AD to the remote satellite terminal VSAT.

Embodiments may have an alternative functionality split, which results in the same overall functionality. The bandwidth control message instead of being sent to the remote satellite terminal VSAT, it is sent to the hub-gateway (HG), which in this case performs the related actions.

FIG. 8 schematically illustrates an IP packet, which may be used for bandwidth request signalling. Header H of the IP packet typically includes the following fields:
version field VS of 4 bits;
header length field HL of 4 bits;
type of service field TOS of 8 bits/one byte 1 B;
total length field TL of 2 bytes 2 B;
identification field ID of 16 bits;
fragmentation field FR composed of 3-bit flags field and 13-bit fragment offset field;
time to live TTL field of 8 bits;
protocol field PT of 8 bits;
header checksum CS of 16 bits;
source IP address As of 32 bits;
destination IP address Ad of 32 bits.
IP packet data part D contains transmitted data.

In an embodiment, a field of the IP packet header H may be used to distinguish smart IP packets SP for bandwidth control from other IP packets.

In an example embodiment, the field destination IP address Ad may be used for this purpose. The field destination IP address Ad may be reserved so that access devices AD are able to mark to the remote satellite terminals VSAT an IP packet having the functionality of bandwidth control message.

The remote satellite terminal VSAT has the intelligence to identify the specific reserved address when sent by the access device AD. Upon recognizing the reserved IP destination address Ad, the remote satellite terminal VSAT does not to transmit the packet over the satellite link to the hub-gateway HG, but it uses it to extract information on bandwidth allocation requirement and in order to evaluate the necessity of taking appropriate actions in terms of bandwidth allocation. After the smart IP packet SP has been analyzed, it may be discarded by the remote satellite terminal VSAT.

In further embodiments, there are up to four IP addresses reserved, one for each of the four input queues of the remote satellite terminal VSAT.

In further embodiments, the destination IP addresses Ad to be used between the access device AD and the VSAT may be reserved for use inside private networks so that it does not appear anywhere else in the public Internet, in case it is possible to guarantee that such addresses are not utilized by any other private Internet application in this environment. Document RFC1918 [2] describes which are the IP addresses set aside for private networks.

In a further example embodiment, the time to live field TTL of the IP header H may be used for the purpose of distinguishing smart IP packets SP for bandwidth control from other IP packets. For example, the remote satellite terminal VSAT can be configured to check if the destination IP address Ad is equal to the IP address of the remote satellite terminal VSAT when the time to live field TTL is equal to zero, and then to decide whether take appropriate actions if this combination happens. As regards input buffer queues to be used, the VSAT may look at the source IP address field As relating to the different applications.

In further embodiments, other IP header markings may be used in common understanding with the remote satellite terminal vendor to identify smart control packets SP. Important is that the combination chosen in the IP header H to identify the smart control packet SP does not show up in any other IP packet header H sent from access device AD to the remote satellite terminal VSAT during NGN protocol signaling or VoIP communication.

In a further example embodiment, the smart IP packets SP may be UDP packets.

In this case, the Protocol field PT of the IP packet header H is marked with the code-number corresponding to UDP protocol which is the protocol used in the next level. In IP version 4 (IPv4) the protocol field PT is called "Protocol" and it identifies the next level protocol while in IP version 6 the protocol field PT is called "Next Header" field. The most popular next level protocols are TCP, UDP, ICMP, IGMP and EGP.

The data part D of the IP packet contains the header and data of the UDP protocol.

FIG. 9 schematically illustrates an UDP packet. Header UH of the UDP packet typically includes the following fields:
 source port number field SPN of 16 bits;
 destination port number field DPN of 16 bits;
 UDP length field UL of 16 bits;
 UDP checksum field CS of 16 bits.

The UDP packet header UH may conveniently be used for the purpose of distinguishing smart IP packets SP for bandwidth control from other IP packets. For example, either the source port number field SPN or the destination port number field DPN may be used to mark the UDP packet as being a smart IP packet SP in agreement with the vendor of the remote satellite terminal VSAT.

In agreement with such vendor, it may be possible to register the port number via the IANA Assigned Numbers database (www.iana.org/assignments/port-numbers) or alternatively, the port may be a dynamic or private port to be registered as outlined in section 19.9. of IETF RFC 4340.

In further embodiments, the UDP packet can be marked as a smart IP packet SP in the IP packet header H.

The data part UD of the UDP packet may be used to convey information relating to the required actions to be taken by the remote satellite terminal VSAT for bandwidth control.

For example, the information may be conveyed by using the following fields:
 an operation code field OC of e.g. 8 bits;
 a number of set-up calls field NC of e.g. 8 bits;
 a bandwidth field BW of e.g. 8 bits;
 a device identifier field DI of 3.g.e. 8 bits.

For example, as regards the operation code field OC, its first bit, bit[0], may be used to convey information whether the mode is "add" or "keep", e.g. if bit [0]=0→then mode is set to "add" otherwise if bit [0]=1→then mode is set to "keep".

Typically, priority queues to be used in the remote satellite terminal VSAT are selected in accordance to usual methods, as for example by using the type of service field TOS or the source IP address field As to distinguish the queues to be selected.

In scenarios in which the IP packet cannot be marked to identify the input queues to be used, e.g. when only one source IP address As can be used, the UDP packet data UD may also provide information on the input queues to be used. For example, such information may be coded in the operation code field OC as follows:
 the second and third bits, bits[2 1], of the operation code field OC may be used to convey such information as follows:
  bits [2 1]=0→queue 1 is to be selected;
  bits [2 1]=1→queue 2 is to be selected;
  bits [2 1]=2→queue 3 is to be selected;
  bits [2 1]=3→queue 4 is to be selected.

In case the operation code field OC is set to the "keep" mode, the number of set-up calls field NC may be used by the access device AD to inform how many calls are set up, i.e. the established call connections that are going through the access device AD towards the remote satellite terminal VSAT. The call number field NC allows the remote satellite terminal VSAT to know how much bandwidth is to be kept as a minimum in the presence of silence from all or from part of the subscribers.

For example, if the call number field NC is set to 3 VoIP calls and if the bandwidth field BW is set to a value corresponding to 10 kbit/s, then the VSAT is informed that it has to keep a minimum of 3×10 kbit/s=30 kbit/s RBDC bandwidth always available, even in the presence of no voice activity or silence from the 3 subscribers engaged in the 3 VoIP calls.

The call number field NC is unused in case the operation code field OC is set to the "add" mode.

The bandwidth field BW provides information on the minimum bandwidth to be kept for each IP service.

For example, the bandwidth field BW may distinguish VoIP calls from codecs. The first bit of the bandwidth field BW, bit [0], may signal whether the remaining bits of the field are to be interpreted as a numerical bandwidth or as a code of the used type of codecs.

For example, when bandwidth bit[0]=0, then the bandwidth field BW is to be interpreted as a bandwidth code and the remote satellite terminal VSAT multiplies the remaining bits of the bandwidth field BW by the number of set up calls, thus getting the minimum bandwidth to be kept in case of "keep" mode or to be added in case of "add" mode.

When the result of the multiplication bandwidth×Number of set-up calls, which represents a minimum threshold, is above the bandwidth effectively available at that moment, then the difference between both is added so that this minimum is kept. When the result of the multiplication is below the bandwidth effectively available at that moment, no bandwidth allocation is needed in order to keep the minimum, so no action needs to be taken.

In further embodiments, the minimum bandwidth to be maintained does not correspond exactly to the result of the multiplication but it is derived from it, in a non-linear manner; such decision, which may be a complex decision, may be taken, by the remote satellite terminal VSAT, in accordance with some statistical considerations. For example, if the bandwidth field BW is set to a value corresponding to 10 kbit/s, the minimum bandwidth to be maintained for 12 existing calls may be set to 80 kbit/s which is less than 120 kbit/s=12×10 kbit/s.

When bandwidth bit[0]=1, the bandwidth field BW is to be interpreted as a codec type, e.g. G.723.1, G.729, G.726. In this case, the VSAT is capable to identify which type of codec is being used and then to derive the minimum bandwidth to be kept in case of "keep" mode or the bandwidth to be added in case of "add" mode. The minimum bandwidth may be derived, for example, by multiplying the number of calls by the VoIP call bandwidth implied by the choice of codec.

In case the operation code field OC is set to the "keep" mode, the device identifier field DI is used to identify the identification number of the access devices connected to the VSAT, e.g. when an Ethernet switch ES is used. The remote satellite terminal VSAT uses this information to create a plurality of sub-processes, on per each device, for keeping minimum bandwidth on a per device basis.

This device identifier DI may be previously configured equally in the access device and VSAT.

The way the above fields are organized in the UDP header UH and the way values are assigned are for explanatory purposes only and should not limit the scope of the claimed invention.

In practice, there are scenarios in which several access devices are connected to the same VSAT through an Ethernet switch, e.g., a SIP phone, a CPG and an access gateway.

The device identifier field DI is unused in case the operation code field OC is set to the "add" mode.

In embodiments in which several simultaneous calls are established at once, the control bandwidth message provides information on the minimum bandwidth quantity to be allocated over the satellite link in case all subscribers are silent. The remote satellite terminal VSAT has then to analyze the control bandwidth message, compare the required minimum bandwidth with the actually available bandwidth and do nothing, in case the available bandwidth is equal or greater than the minimum bandwidth, or ask the hub-gateway HG for the amount of bandwidth to be kept allocated as minimum.

In embodiments in which several access devices AD2, AD3, AD4, are connected to one remote satellite terminal VSAT, each access device AD2, . . . , AD4 has to handle its own control bandwidth message independently, in the "add" and in the "keep" mode. In FIG. 1 for example three access devices AD2, . . . , AD4 a IP-phone device, a CPG device, GSM NANO base station device are connected to the Ethernet switch ES. Assuming that there are 3 ongoing calls from the NANO base station AD4, 1 call from the SIP phone AD3 and 2 calls from the CPG device AD2, where the needed bandwidth per call is e.g. 20 kbit/s. Assuming that when there is silence, a minimum of e.g. 10 kbit/s per call is to be maintained. Under these circumstances, the NANO base station AD4 periodically sends a control bandwidth message with a request of maintaining the bandwidth to a minimum value of 30 kbit/s, while the SIP phone AD3 sends a control bandwidth message with a request of maintaining the bandwidth to a minimum value of 20 kbit/s, and the SIP phone sends a control bandwidth message with a request of maintaining the bandwidth to a minimum value of 10 kbit/s.

These control messages are analyzed individually according, for example, the IP source address Ad in the IP header H which is different for each of the three access devices AD2, . . . , AD4. The remote satellite terminal VSAT keeps a sub-process for each access device AD2, . . . , AD4.

In case all six subscribers are talking, i.e. 3+2+1, the rate-based allocated bandwidth is 3×20 kbit/s+2×20 kbit/s+1×20 kbit/s=120 kbit/s.

In case 2 subscribers from the NANO base station AD4 go silent, while the other 3 subscriber from the other devices AD2, AD* continue talking, the 30 kbit/s bandwidth is compared with the current rate coming from the NANO base station AD4, again based on the IP source address Ads or the device identifier DI.

As the rate coming from the NANO base station AD4 goes down to 20 kbit/s (from 60 kbit/s when there was no silence), the control message will cause the total bandwidth to be kept at 30 kbit/s, although one single subscriber talking requires only 20 kbit/s.

All numerical values, minimum required bandwidth, number of connected access devices and number of ongoing calls have been used for explanatory purposes only and should not limit the scope of the claimed invention.

Thus, as above explained, the access devices AD are capable of generating VoIP calls or IP services requiring QoS and are able to keep track of the number of established calls and periodically send smart IP packets SP.

The remote satellite terminals VSAT, on the other hand, are capable to compare the implied bandwidth of "keep" mode smart packets SP with the allocated bandwidth, and take appropriate actions, e.g. as asking for complementary bandwidth to keep minimum bandwidth in the presence of silence.

The method may be implemented in IP broadband satellite systems that use a dynamic bandwidth request mechanism similar to mechanism of DVB-RCS systems in which capacity requests are embedded in SYNC bursts. According to this type of request mechanism, SYNC bursts are transmitted from the remote satellite terminal VSAT roughly every second, and they represent a dedicated non-contended channel for sending requests to the hub-gateway HG. These SYNC bursts may be configured per system to be transmitted, say, every 2 seconds instead of every second. This type of bandwidth request mechanism guarantees collision-free requests every second, which is a desirable feature in case of overlaying NGN protocol solutions over IP broadband satellite.

The access device AD on which the proposed embodiments are implemented may be VoIP access gateways AD1, CPEs, CPGs or any access device that needs to go through the same steps of VoIP signaling and communications as outlined above.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

In addition to the embodiments described above, the skilled persons in the art will be able to arrive at a variety of other arrangements and steps which, if not explicitly described in this document, nevertheless fall within the scope of the appended claims. For example, the invention is applicable to satellite communication systems as well as to other types of communication systems such as terrestrial communication systems. It will be understood that variations and modifications can be effected within the spirit and scope of the claims which may include the phrase "at least one of A, B and C" as an alternative expression that means one or more of A, B and C may be used, contrary to the holding in *Superguide V. DIRECTV*, 358 F.3d 870, 69 USPQ2d 1865 (Fed. Cir. 2004).

List of Cited Industry Specifications

[1] EN 301790 ETSI Standard
    Digital Video Broadcasting (DVB);
    Interaction channel for satellite distribution systems
    [2] RFC 1918 Request for Comments 1918 of Network Working Group
    Address Allocation for Private Internets List of Used Acronyms CPE Customer Premises Equipment
    CPG Customer Premises Gateway
    CRA Continuous Rate Assignment
    BTS Base Transceiver Station
    DVB-RCS Digital Video Broadcasting-Return Channel Satellite
    EGP Exterior Gateway Protocol
    ETSI European Telecommunications Standards Institute
    H.248 ITU-T standard, Series H=Audiovisual and
    ICMP Internet Control Message Protocol
    IGMP Internet Group Management Protocol
    MEGACO Media Gateway Control, same as H.248
    NGN Next Generation Networks GSM Global System for Mobile Communications
RBDC Rate-based dynamic capacity
RCST Return Channel Satellite Terminal
SIP Session Initiation Protocol
TCP Transmission Control Protocol
UDP User Datagram Protocol
VSAT Very Small Aperture Terminal

The invention claimed is:

1. A method for allocating bandwidth for voice over Internet protocol calls over a satellite communication system, in which a remote satellite terminal is requesting to a hub-gateway, bandwidth to be allocated according to a dynamic technique based on the packet rate between an access device and the remote satellite terminal, comprising:
receiving, by the remote satellite terminal, a bandwidth request message sent from the access device containing information on bandwidth allocation requirements for a given set of voice over Internet protocol calls, the access device sending the bandwidth request message instructing the remote satellite terminal to maintain a minimum bandwidth amount during a voice over IP call;
identifying the bandwidth request message in messaged information received by the remote satellite terminal;
analyzing the information on bandwidth allocation requirements contained in the messaged information by the remote satellite terminal;
sending a request, upon necessity, from the remote satellite terminal to the hub-gateway for bandwidth to be allocated in accordance with the bandwidth request message received, the bandwidth to be allocated as a result of the request from the remote satellite terminal being additional bandwidth to be added to previously allocated bandwidth; and
adding the additional bandwidth during a set-up phase of the set of voice over Internet protocol calls.

2. The method according to claim 1, wherein the bandwidth request message is a smart Internet protocol packet having a function of a bandwidth control message packet.

3. The method according to claim 2, wherein the smart Internet protocol packet has an Internet protocol header marked to identify the bandwidth control message.

4. The method according to claim 3, wherein the smart Internet protocol header packet has a data part set to provide information on bandwidth allocation requirements for a given set of voice over Internet protocol calls.

5. The method according to claim 4, wherein the smart Internet protocol packet is a User Datagram Protocol packet.

6. The method according to claim 5, wherein the information on bandwidth allocation requirements contain at least one of an allocation mode to be performed as either add or keep, a number of established calls, a minimum bandwidth to be allocated per service/call, and a device identifier.

7. The method according to claim 1, wherein the bandwidth request message is exchanged via at least one of a Transmission Control Protocol connection, a User Datagram Protocol packet exchange and Ethernet packets.

8. The method according to claim 7,
wherein the set of voice over Internet protocol calls is treated with silence suppression techniques, and
wherein the bandwidth to be allocated as a result of the request from the remote satellite terminal is a minimum amount of bandwidth to be kept during duration of the set of the voice over Internet protocol calls.

9. The method according to claim 1, wherein the bandwidth request message is sent at a set-up phase of the voice over IP call.

10. The method according to claim 1, wherein the bandwidth control message is sent during a silent period of an existing voice over IP call.

11. A method for allocating bandwidth for voice over Internet protocol calls over a satellite communication system, in which a remote satellite terminal is requesting a hub-gateway to allocate bandwidth according to a dynamic technique based on a packet rate between an access device and the remote satellite terminal, comprising:
receiving, by the hub-gateway, a bandwidth request message sent from the access device containing information on bandwidth allocation requirements for a given set of voice over Internet protocol calls, the access device sending the bandwidth request message instructing the remote satellite terminal to maintain a minimum bandwidth amount during a voice over IP call;
identifying the bandwidth request message in messaged information received by the hub-gateway;
analyzing, by the hub-gateway, the information on bandwidth allocation requirements contained in the messaged information;
allocating, by the hub-gateway based on a request by the remote satellite terminal, bandwidth determined to be necessary in accordance with the bandwidth request message, the bandwidth to be allocated as a result of the request from the remote satellite terminal being additional bandwidth to be added to previously allocated bandwidth; and
adding the additional bandwidth during a set-up phase of the set of voice over Internet protocol calls.

12. The method according to claim 11, wherein the bandwidth request message is a smart Internet protocol packet having a function of a bandwidth control message packet.

13. The method according to claim 12, wherein the smart Internet protocol packet has an Internet protocol header marked to identify the bandwidth control message.

14. The method according to claim 13, wherein the smart Internet protocol header packet has a data part set to provide information on bandwidth allocation requirements for a given set of voice over Internet protocol calls.

15. The method according to claim 14, wherein the smart Internet protocol packet is a User Datagram Protocol packet.

16. The method according to claim 15, wherein the information on bandwidth allocation requirements contain at least one of an allocation mode to be performed as either add or keep, a number of established calls, a minimum bandwidth to be allocated per service/call, and a device identifier.

17. The method according to claim 11, wherein the bandwidth request message is exchanged via at least one of a Transmission Control Protocol connection, a User Datagram Protocol packet exchange and Ethernet packets.

18. The method according to claim 17,
wherein the set of voice over Internet protocol calls is treated with silence suppression techniques, and
wherein the bandwidth to be allocated as a result of the request from the remote satellite terminal is a minimum amount of bandwidth to be kept during duration of the set of the voice over Internet protocol calls.

19. A method for allocating bandwidth for VoIP calls over a communication system, in which a remote terminal is requesting to a hub-gateway, bandwidth to be allocated according to a dynamic technique based on the packet rate between an access device and the remote terminal, comprising:
receiving, by the remote terminal, from the access device, a bandwidth request message containing information on bandwidth allocation requirements for a given set of VoIP calls, the access device sending the bandwidth request message instructing the remote terminal to maintain a minimum bandwidth amount during a voice over IP call;
identifying, by the remote terminal or by the hub-gateway, the received messaged information;

analyzing, by the remote terminal or by the hub-gateway, the information on bandwidth allocation requirements contained in the messaged information;

requesting, by the remote terminal, upon necessity, bandwidth to be allocated in accordance with the bandwidth request message received, the bandwidth to be allocated as a result of the request from the remote terminal being additional bandwidth to be added to previously allocated bandwidth; and adding the additional bandwidth during a set-up phase of the set of voice over Internet protocol calls.

20. A system for allocating bandwidth for voice over Internet protocol calls over a satellite communication system, in which a remote satellite terminal is requesting to a hub-gateway, bandwidth to be allocated according to a dynamic technique based on the packet rate between an access device and the remote satellite terminal, comprising:

a memory; and at least one processor connected with the memory, to execute:

receiving a bandwidth request message, sent from the access device to the remote satellite terminal, containing information on bandwidth allocation requirements for a given set of voice over Internet protocol calls, the access device sending the bandwidth request message instructing the remote satellite terminal to maintain a minimum bandwidth amount during a voice over IP call;

identifying the bandwidth request message in messaged information received by the remote satellite terminal;

analyzing the information on bandwidth allocation requirements contained in the messaged information by the remote satellite terminal;

sending a request, upon necessity, from the remote satellite terminal to the hub-gateway for bandwidth to be allocated in accordance with the bandwidth request message received, the bandwidth to be allocated as a result of the request from the remote satellite terminal being additional bandwidth to be added to previously allocated bandwidth; and adding the additional bandwidth during a set-up phase of the set of voice over Internet protocol calls.

\* \* \* \* \*